Sept. 8, 1925.
J. ALLEN
ELECTRIC LIGHT FOR HAND BAGS
Filed Feb. 28, 1923
1,552,404
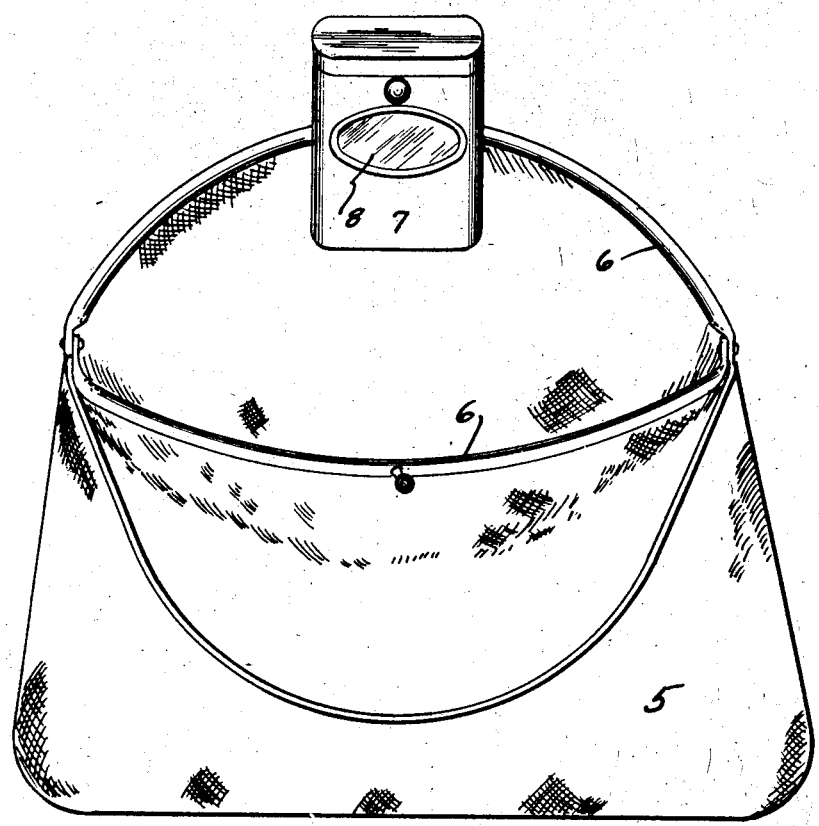
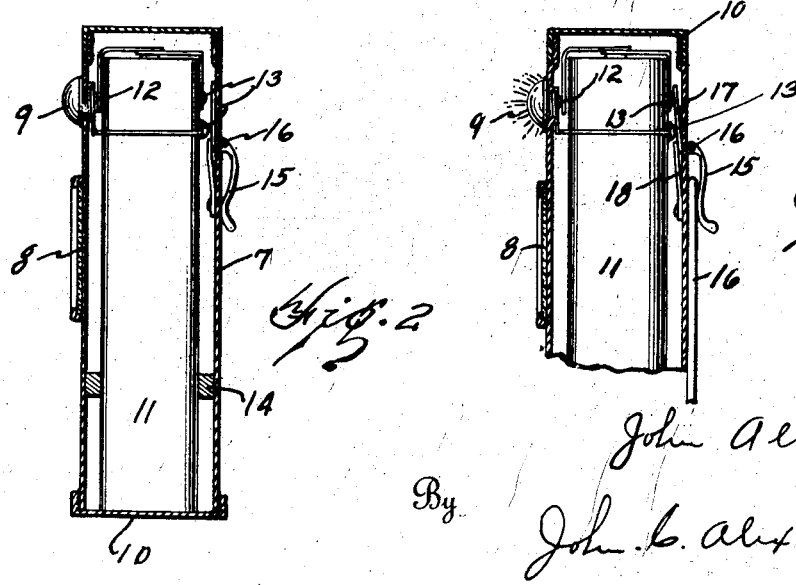

Patented Sept. 8, 1925.

1,552,404

UNITED STATES PATENT OFFICE.

JOHN ALLEN, OF DETROIT, MICHIGAN.

ELECTRIC LIGHT FOR HAND BAGS.

Application filed February 28, 1923. Serial No. 621,778.

*To all whom it may concern:*

Be it known that I, JOHN ALLEN, a subject of the King of Great Britain and Ireland, residing at Detroit, in the county of Wayne and State of Michigan, have invented certain new and useful Improvements in Electric Lights for Hand Bags, of which the following is a specification.

My invention relates to an improved electric light for a hand bag. The object is to provide a combined electric light and mirror of simple, inexpensive construction, adapted to be carried within a hand bag and used in conjunction therewith.

A further object is to provide such a light and mirror combination which may be used independently of the hand bag or in conjunction with the bag and which is so constructed that when secured to the bag a circuit is made through the light bulb, illuminating the mirror but when the light is carried within the interior of the bag and not intended for use the circuit is automatically broken.

Further objects together with the construction and operation of the invention will more fully appear from the following description, appended claims and accompanying drawings, in which:

Figure 1 is a perspective of a hand bag provided with my improved invention.

Fig. 2 is a cross-sectional view through the battery casing showing the battery in elevation.

Fig. 3 is a fragmentary sectional view through the battery casing showing the circuit closed through the light.

My improved flash light and mirror combination is intended to be sold as a separate article of merchandise to be used in connection with any of the well known types of hand bags and may be carried loose within the bag, or when desired for use attached to the edge of the bag in such a manner that the mirror is displayed and the light is automatically illuminated through the attachment of the casing to the edge of the bag.

In the drawings, let 5 indicate a hand bag having meeting edges 6. My improved combined light and mirror comprises a casing 7 provided on one side with a mirror 8 positioned in proximity the mirror to illuminate the same and here being shown as being disposed directly above the mirror is a light bulb 9. The interior of the casing is accessible to receive a battery by means of the removable cover 10. I provide a battery 11 removably receivable within the casing adapted to form a lighting contact 12 with the electric light bulb 9. This battery is provided on the side opposite the light bulb with a pair of switch contacts 13. These are normally disconnected when the battery is disposed within the casing but are adapted when connected to make the circuit through the light bulb 9. The casing is provided with interior spacing members 14 to hold the battery firmly in position so that the contacts 13 will not be closed by accidentally striking against the metal wall of the casing.

I provide a catch or clip 15 which is pivoted to the casing at 16 and is adapted to be engaged over the edge of the hand bag as shown in Fig. 3 so that the casing will be supported as shown in Fig. 1. This catch extends through the wall of the casing and is provided with an extension 17 which is adapted to serve as a movable switch member to bridge the contacts 13. This switch member is normally held out of engagement with said contacts by means of a spring 18 but when the clip 15 is withdrawn to permit of its engagement over the edge of the bag the switch member 17 is moved inwardly against the resistance of the spring bridging the contacts 13 and making the circuit through the light. It will be seen, therefore, that when the light is in use and the clip which supports the casing is engaged over the edge of the bag that the mirror will be illuminated. Furthermore, if it is not desired to use the light in connection with the bag the catch member 15 may be held outwardly and when so held the movable switch member 17 will bridge the contacts and make the circuit through the light.

What I claim is:

1. In an electric flash light for a hand bag, in combination, a battery casing having a mirror and a light bulb disposed in proximity to said mirror to illuminate the same, a battery receivable within said casing to form lighting contact with said light bulb, said battery having external switch contacts normally disconnected but adapted to be closed to make a circuit through the light bulb, a spring clip carried by the casing adapted to be engaged over the edge of a hand bag to support the casing and having a switch member interiorly of the casing adapted to bridge the contacts of the battery to make the switch close the circuit through the light bulb when the clip is engaged over the edge of the hand bag.

2. In an electric flash light for a hand bag, in combination, a battery casing having a mirror at one side, a light bulb disposed above said mirror to illuminate the same, a clip on the opposite side to engage over the edge of a hand bag to support the casing, a battery receivable within said casing to make lighting contact with the light bulb having external switch contacts normally open when the battery is in the casing but adapted to be closed to make a circuit through the light bulb, a switch member connected with said clip to be controlled thereby adapted to be moved into engagement with said switch contacts to make the circuit through the light bulb, and a spring normally holding said switch member out of engagement with said contacts adapted to be overcome to permit the switch member to close said contacts when the clip on the casing is withdrawn to engage over the edge of a hand bag.

JOHN ALLEN.